W. V. TURNER.
FLUID PRESSURE BRAKE APPARATUS.
APPLICATION FILED MAY 5, 1915.
1,203,078.
Patented Oct. 31, 1916.
3 SHEETS—SHEET 1.
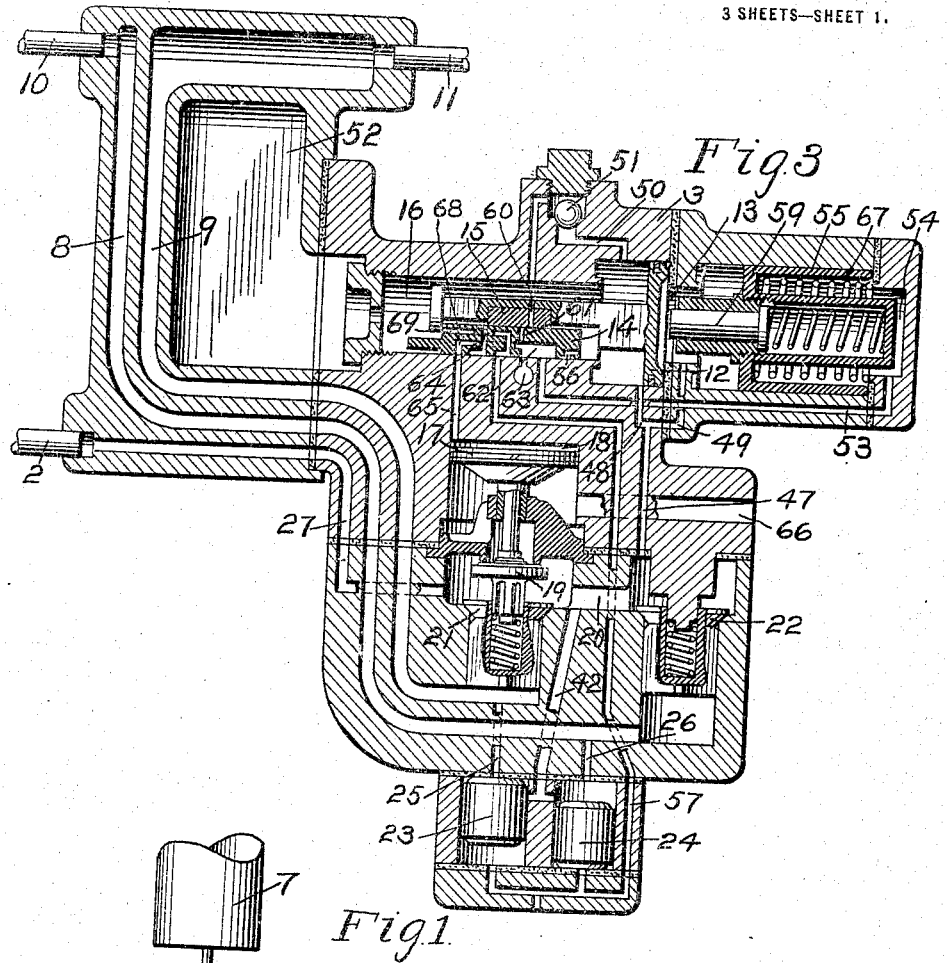
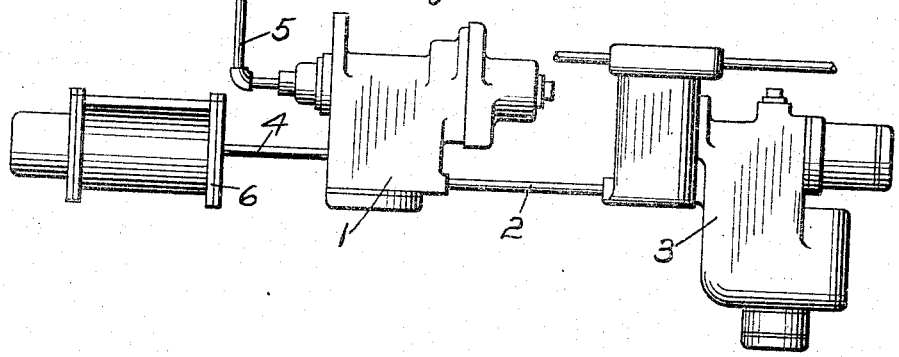
WITNESSES
INVENTOR
Walter V. Turner
by Wm. M. Cady
Att'y.

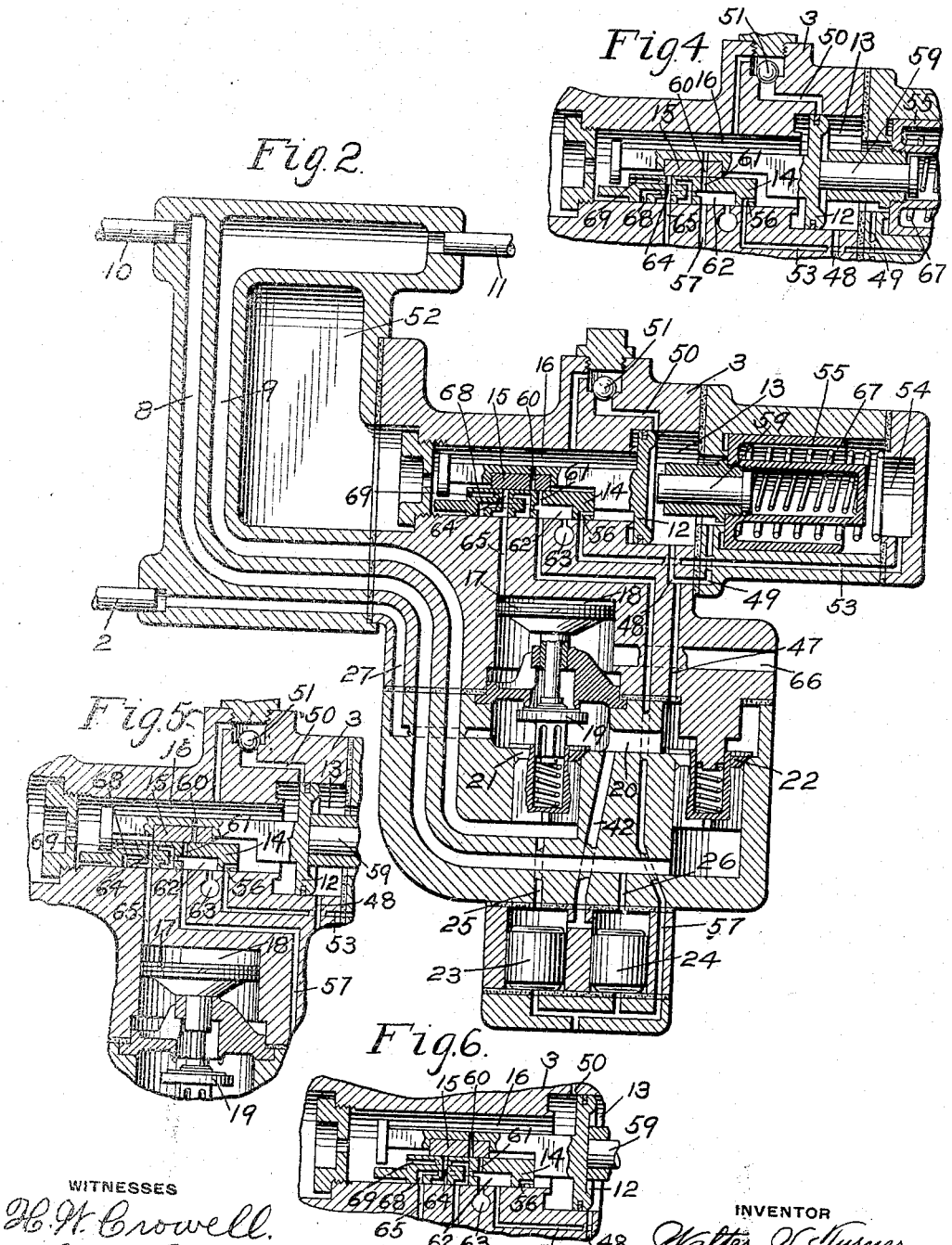

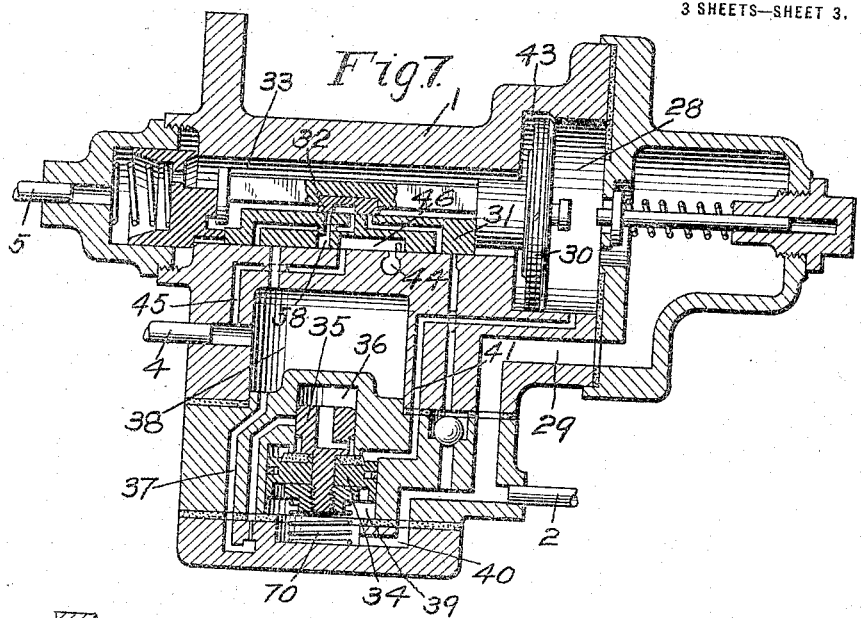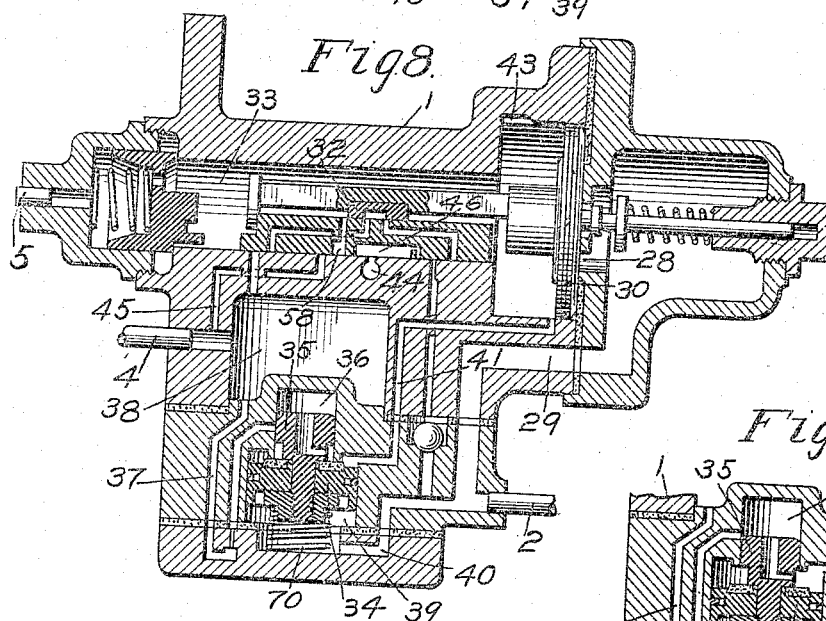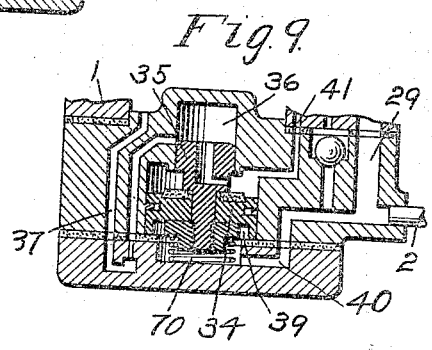

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE APPARATUS.

1,203,078. Specification of Letters Patent. Patented Oct. 31, 1916.

Application filed May 5, 1915. Serial No. 25,920.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Apparatus, of which the following is a specification.

This invention relates to fluid pressure brakes, and the principal object of the invention is to provide a brake apparatus adapted to effect a substantially simultaneous application of the brakes throughout the train.

While the well known quick serial action feature heretofore employed for locally venting the brake pipe to secure the rapid transmission of the brake pipe reduction through the train operates with sufficient rapidity on short trains, with the increasing length and weight of trains, particularly in freight service, it is found that before quick action has had time to travel through the train, the brakes at the head end of the train will be heavily applied while those at the rear end have not started to apply. This permits the slack to run in and the momentum of the unbraked rear cars running into the braked cars at the head end frequently causes dangerous shocks and collisions, and sometimes buckling of the train. It will thus be evident that in handling long freight trains it is highly desirable to have the brakes applied on all the cars of the train as nearly simultaneously as possible.

In the accompanying drawings, Figure 1 is a diagrammatic view of a car air brake equipment with my improvements applied thereto; Fig. 2 a central sectional view of the vent valve mechanism, showing the parts in normal release position; Fig. 3 a similar view, showing the parts in the final emergency application position; Fig. 4 a fragmentary sectional view, showing the emergency valve in service application position; Fig. 5 a fragmentary sectional view, showing the emergency valve and the quick action valve in an intermediate position, assumed upon a sudden reduction in brake pipe pressure; Fig. 6 a fragmentary sectional view, showing the emergency valve in the emergency lap position; Fig. 7 a central sectional view of the triple valve device and the hold back valve mechanism, with the parts in normal release position; Fig. 8 a similar view, showing the parts in the initial emergency application position; and Fig. 9 a fragmentary sectional view, showing the hold back valve mechanism in open position.

According to my invention, a triple valve device 1 is provided, having a brake pipe connection 2 to a vent valve mechanism 3 and connected by the respective pipes 4 and 5 to brake cylinder 6 and auxiliary reservoir 7.

The vent valve mechanism 3 may comprise a casing having passages 8 and 9 leading to portions of the main brake pipe 10 and 11, one portion of the brake pipe opening forward and the other rearward, according to which way the car is turned.

Within the vent valve casing is an emergency valve mechanism comprising a piston 12, contained in piston chamber 13, and a main slide valve 14 and a graduating slide valve 15, contained in valve chamber 16, and adapted to be operated by piston 12. There is also provided a quick action valve mechanism comprising a piston 17, contained in piston chamber 18, and a valve 19, contained in valve chamber 20, and adapted to be operated by piston 17.

Two brake pipe check valves 21 and 22 are employed, the check valve 21 preventing back flow to the brake pipe passage 9 and the check valve 22 to the passage 8. Two cut-off check valves 23 and 24 are also provided, the check valve 23 having a passage 25, leading from the space above the check valve to brake pipe passage 9 and the check valve 24 having a passage 26 leading from the space above the check valve to passage 8. A passage 27, leading from check valve chamber 20, opens to pipe 2 and it is through this passage that the brake pipe pressure on the triple valve piston is controlled.

As shown in Figs. 7, 8, and 9 of the drawings, the triple valve may be of the standard retarded release type, although this is not essential.

The triple valve device may comprise a casing having a piston chamber 28 connected by passage 29 with brake pipe connection 2 and containing piston 30 and having a valve chamber 33 containing main slide valve 31 and graduating slide valve 32 adapted to be operated by piston 30, the valve chamber 33 being open through pipe 5 to the auxiliary reservoir 7. In addition, the triple valve casing contains a double seating valve piston 34 for controlling the admission of fluid from the auxiliary reservoir to the brake cylinder in an emergency application of the brakes.

The valve piston 34 may be arranged, as shown in a separate section which may be applied to the triple valve device in place of the usual quick action valve section. The valve piston 34 is provided with a piston stem 35 reciprocating in chamber 36 and controlling communication from brake cylinder passage 37 to chamber 36, the port opening of passage 37 being so located that nearly the full movement of the valve piston 34 to its lower seat is required to open the passage to chamber 36. The chamber 39 below the valve piston 34 is open through passage 40 to brake pipe passage 29.

A passage 41 leads from the piston chamber 28 to the space above the valve piston 34, and outside of the seated area thereof. Said passage is so positioned that normally the passage opens at the brake pipe side of the piston 30 but when the piston moves to emergency position, the passage opens to the auxiliary reservoir side.

In operation, assuming that the brake pipe portion 11 is toward the brake valve end of the car, when fluid is supplied to the brake pipe in the charging position of the brake valve, in the usual manner, there is a flow of fluid from the brake pipe portion 11 to passage 9, whence it flows through passage 25 to a two way passage 42 leading to the check valve chamber 20. Since the two way passage normally connects the respective chambers above the cut off check valves 23 and 24, fluid can also flow from passage 25 to passage 26 and thence through brake pipe passage 8 to brake pipe portion 10 leading to the rear of the train, so that the cars at the rear may be charged with fluid under pressure in the usual manner. From check valve chamber 20, fluid flows through passage 27 and pipe 2 to the piston chamber 28 of the triple valve device and thence through the usual feed groove 43 to valve chamber 33, thus charging the auxiliary reservoir 7 with fluid under pressure from the brake pipe. With the triple valve in release position, as shown in Fig. 7 of the drawings, the brake cylinder is open to atmospheric exhaust port 44 through passage 45 and cavity 46 in main slide valve 31. Fluid also flows from check valve chamber 20 through a passage 47 to piston chamber 13, said passage having branches 48 and 49, the passage 48 being controlled by the piston 12 so that normally the passage opens at the brake pipe side of the piston, but in emergency application position said passage opens to the quick action chamber side thereof. Fluid supplied to piston chamber 13 flows through a passage 50, containing a non-return check valve 51, and charges the valve chamber 16, and the communicating quick action chamber 52 with fluid under pressure.

In the normal release position of the emergency valve mechanism, a passage 53 leading to the chamber 54 at the back of an emergency stop device 55 is connected by a port 56 in the slide valve 14 with the quick action chamber, so that fluid under pressure is normally supplied to the chamber 54.

A passage 57 opening to the atmosphere and leading to the seat of the slide valve 14 has branches leading to the under sides of the cut off check valves 23 and 24 and since the lower areas of the check valves are thus subject to atmospheric pressure, the brake pipe pressure acting on the upper areas serves to maintain the check valves at their lower seats.

If a gradual reduction in brake pipe pressure is made to effect a service application of the brakes, such reduction will be communicated to the triple valve piston from passage 9 through passage 25, passage 42, check valve chamber 20 and passage 27 and the triple valve parts are then moved in the usual manner to service application position, in which port 58 in the slide valve 31 is caused to register with brake cylinder passage 45, so that fluid is supplied from the auxiliary reservoir to the brake cylinder to effect a service application of the brakes.

In the vent valve mechanism, the emergency piston 12 moves out in response to the gradual reduction in brake pipe pressure, also moving the auxiliary valve 15, this movement being limited by a spring stop 59, mounted within the emergency stop device 55.

In the position in which the piston 12 engages the stop 59, as shown in Fig. 4 of the drawings, port 60 in the auxiliary valve 15 registers with a port 61 opening into cavity 62. Since cavity 62 is now in registry with exhaust port 63, fluid will be vented from the quick action chamber 52 corresponding with the reduction in brake pipe pressure and when the quick action chamber pressure has reduced to a point slightly less than the reduced brake pipe, the piston 12 will move the auxiliary valve 15 back and close the port 61. In this way the pressure in the quick action chamber is maintained at substantially brake pipe pressure in making gradual reductions in brake pipe pressure, so as to prevent possible movement of the emergency valve mechanism to emergency position by the higher pressure which would otherwise exist in the quick action chamber.

If a sudden reduction in brake pipe pressure is made to effect an emergency application of the brakes, the pressure in piston chamber 13 of the emergency valve mechanism is likewise reduced and this reduction is sufficient to cause the piston 12 to move out beyond the service position of Fig. 4 to the position shown in Fig. 5, compressing the spring acting on the stop 59. The auxiliary valve 15 now uncovers a port 64 in slide valve 14 which registers with a passage 65 leading to the chamber above the quick action piston 17, so that fluid from the quick action chamber 52 flows to the piston 17 and forces the same downwardly, opening the vent valve 19.

Both the brake pipe and the brake pipe connection 2 are thus opened to the atmosphere vent port 66. The sudden drop in brake pipe pressure causes the triple valve piston to move to emergency position, as shown in Fig. 8 of the drawings, but it will be noted that in this position, there is no port opened by the triple valve for supplying fluid to the brake cylinder, as in the case of the ordinary triple valve device.

The movement of the triple valve piston 30 to emergency position operates, however, to connect the passage 41 to the auxiliary reservoir side of the piston, so that auxiliary reservoir pressure now acts on the exposed area of the hold back valve piston 34.

When a predetermined reduction in brake pipe pressure has been made, the pressure in quick action chamber 52 will be sufficient to overcome the opposing pressures of the brake pipe and the spring 67 acting on the emergency stop 55. The piston 12 then moves out, compressing the spring 67 and causing movement of the slide valve 14. This movement brings the passage 53 into registry with cavity 62, so that the back of the stop device 55 is now connected with exhaust port 63. The fluid pressure back of the emergency stop being relieved, the quick and positive movement of the emergency valve mechanism to the extreme outer position with the piston 12 against the sealing gasket is assured.

The movement of the slide valve 14 to emergency position, as shown in Fig. 3 of the drawings, disconnects port 64 from passage 65 and connects same through a port 68 with cavity 62 which is still in registry with exhaust port 63. The quick action valve mechanism will then be returned to closed position by the spring acting on the valve 19, thus preventing further venting of fluid from the brake pipe so far as the quick action valve mechanism is concerned. Passage 47 is now open through branch passage 48 to valve chamber 16 and slide valve 14 connects passage 57 with a port 69, opening into valve chamber 16, so that fluid from the quick action chamber 52 and from the brake pipe passages 8 and 9 flows to the atmosphere.

Since the reduction in brake pipe pressure at the brake valve continues, there will be a more rapid rate of reduction through the passage 9 than the pressure reduces through the restricted exhaust port open to the passage 57 and consequently the higher pressure below the cut-off check valve 23 will lift same so as to cut off communication to passage 9. It will thus be apparent that the brake valve vent is now cut off from the brake pipe back of the vent valve mechanism on the first car, so that the brake pipe pressure will only be reduced on the cars at the rear, at the rate permitted by the exhaust port of passage 57.

The foregoing description of the operation assumes that the brake valve is at the side connected to the brake pipe portion 11. If the car is turned about so that the brake pipe portion 10 is on the brake valve side, then the check valve 24 will be shifted to cut off the brake valve from the brake pipe at the rear of the vent valve mechanism, the operation being substantially the same as hereinbefore described where the brake pipe portion 11 is connected at the brake valve side.

If the emergency application is initiated by a parted train or a burst hose, as soon as the quick action valves have operated, the cut-off check valves adjacent to each side of the break will automatically close the open ends of the brake pipe in the same manner as when the brake valve is cut off, upon effecting an emergency application with the brake valve. It is possible that there will be a sufficiently higher pressure underneath both cut-off check valves to momentarily lift same to cut off the brake pipe connections, but only the one adjacent to the break or the brake valve vent will remain in the closed position. The operation of the quick action valves throughout the train is the same as with the ordinary quick action triple valves except that while the triple valves are moved to emergency application position there is no flow of fluid from the auxiliary reservoir to the brake cylinder. After the quick serial action has traveled through the train and all of the quick action valves have been closed as hereinbefore described, the brake pipe pressure still continues to reduce slowly through the passage 57 on each car. The rate of reduction through the passage 57 is slow enough to allow the brake pipe pressure to equalize on the several cars. That is to say, if the brake pipe pressure should happen to be slightly higher at one point than another, the pressure will flow from the high point to the low point until equilibrium in pressure is established throughout the length of the brake pipe.

In the tripple valve device, the hold back valve piston 34 is now subject on one side to auxiliary reservoir pressure over the exposed area and on the opposite side to brake pipe pressure and the pressure of a spring 70. It will now be clear that when the brake pipe pressure has reduced by flow through the passages 57 to a predetermined degree, dependent upon the tension of the spring 70 and the area exposed to auxiliary reservoir pressure, the hold back valve piston 34 will be moved from its upper seat by auxiliary reservoir pressure and since the full area is then exposed to auxiliary reservoir pressure, the prompt and positive movement of the valve piston to its lower seat is assured.

Since the passage 37 is cut off from the chamber 36 during the initial movement of the valve piston 34, full auxiliary reservoir pressure will act in chamber 36 to facilitate the prompt opening movement of same. Upon movement of the valve piston 34 to its lower seat, communication is opened from passage 41 to passage 37, as shown in Fig. 9, so that fluid is now supplied from the auxiliary reservoir to the brake cylinder.

Since, as hereinbefore explained, the brake pipe pressure reduces uniformly throughout the train, the critical predetermined pressure, at which the hold back valves operate, is reached simultaneously on all the cars and the consequence is that fluid is simultaneously admitted to all the brake cylinders throughout the train. By thus providing for the simultaneous application of the brakes, dangerous shocks are prevented from the slack running in and long trains may be handled without difficulty. Furthermore, fluid may be supplied to the brake cylinder at a greater rate without danger, since the brakes are not applied at one section of the train ahead of another section.

When the brake pipe pressure has been reduced to a predetermined minimum degree through the passage 57, preferably at a point slightly below that at which the hold back valves open, the force exerted by the emergency spring 67 will be greater than that of the brake pipe pressure which acts in opposition to spring pressure and the emergency valve parts will then be shifted back to emergency lap position, as shown in Fig. 6 of the drawings. In this position, branch passage 48 is cut off from the valve chamber 16 and is opened to the brake pipe side of the piston, so that the brake pipe pressure can no longer reduce through the passage 57. The quick action chamber pressure, however, continues to reduce until the pressure therein is slightly below the brake pipe pressure, when the emergency piston and valves will be returned to normal position, as shown in Fig. 2.

When the brake pipe pressure is restored to release the brakes, the quick action chamber 52 will be recharged and the increased brake pipe pressure acting on the tripple valve piston will return the same to normal release position, permitting the exhaust of fluid from the brake cylinder and the recharging of the auxiliary reservoir.

When the brake valve is operated to effect a sudden reduction in brake pipe pressure and the first quick action valve is actuated to vent fluid from the brake pipe, a wave of reduction travels back through the train ahead of the serial operation of the quick action valves to reduce the pressure. According to my invention, advantage is taken of this fact, for while this wave of reduction is not of sufficient intensity to move the emergency piston to emergency position, the same will be moved to the service position, in which the auxiliary valve 15 uncovers the port 61, so that fluid from the quick action chamber 52 is vented to the atmosphere. As a result, there will be a serially increasing reduction in quick action chamber pressure toward the rear of the train by the time the quick action reduction in brake pipe pressure becomes sufficient to effect the movement of the emergency piston to its first emergency position and since the slide valve 14 does not move until the brake pipe pressure has been reduced to a point, where the force exerted by the quick action chamber pressure exceeds the brake pipe pressure combined with the pressure of the spring 67, it will be clear that at the forward end of the train, the vent valves will be operated at a higher brake pipe pressure than at the rear of the train where the brake pipe pressure must be reduced lower than the reduced quick action chamber pressure. By reason of this, the brake pipe pressure at the rear of the train reduces to a lower point than at the front before the brake pipe vent is restricted. As a consequence, the predetermined pressure at which the hold back valves operate can be reached more promptly and it also facilitates the action of the restricted brake pipe vents in equalizing the reduction in brake pipe pressure throughout the train.

By providing means for automatically cutting off the vent at which the sudden reduction is initiated and then slowly reducing the brake pipe pressure through a restricted vent at each car throughout the train, a uniform reduced brake pipe pressure throughout the train can be secured, so that by providing a brake cylinder supply valve adapted to open at a predetermined reduction in brake pipe pressure, the brakes can be applied simultaneously.

Having now described my invention, what I claim as new and desire to secure by Letters Patent, is:

1. In a fluid pressure brake, the combination with a brake pipe, of means operating upon a sudden reduction in brake pipe pressure for cutting off the section of brake pipe, leading to the point of reduction, from the section of brake pipe leading away from same and a plurality of emergency valve mechanisms connected to the brake pipe and each operated upon a sudden reduction in brake pipe pressure for opening a restricted vent port to the brake pipe.

2. In a fluid pressure brake, the combination with a brake pipe, of means operated upon a sudden reduction in brake pipe pressure for opening a restricted vent port to the brake pipe on each car of the train.

3. In a fluid pressure brake, the combination with a brake pipe, of a plurality of emergency valve mechanisms connected to the brake pipe and each operated upon a sudden reduction in brake pipe pressure for opening a restricted vent to the brake pipe, to thereby effect a gradual reduction in brake pipe pressure throughout the train.

4. In a fluid pressure brake, the combination with a brake pipe, of a plurality of emergency valve mechanisms connected to the brake pipe and each operated upon a sudden reduction in brake pipe pressure for opening a restricted vent to the brake pipe and means for cutting off from the brake pipe the vent opening at which the sudden reduction is effected when the brake pipe pressure has been reduced to a predetermined degree.

5. In a fluid pressure brake, the combination with a brake pipe, of an emergency valve mechanism operated upon a sudden reduction in brake pipe pressure for opening a restricted vent to the brake pipe, a quick action valve device for effecting a local reduction in brake pipe pressure, and means operated by the sudden reduction in brake pipe pressure for cutting off the local section of brake pipe at which the sudden reduction is initiated from the remainder of the brake pipe.

6. In a fluid pressure brake, the combination with a brake pipe, of a quick action valve device and an emergency valve mechanism operated upon an initial sudden reduction in brake pipe pressure for operating said quick action valve device to effect a local sudden reduction in brake pipe pressure and the propagation of quick action throughout the brake pipe and adapted to open a restricted vent port to the brake pipe for gradually reducing the brake pipe pressure.

7. In a fluid pressure brake, the combination with a brake pipe, of a quick action valve device and an emergency valve mechanism operated upon the initiation of a sudden reduction in brake pipe pressure for operating said quick action valve device to effect a local reduction in brake pipe pressure of a predetermined amount, said emergency valve mechanism being also adapted to open a restricted vent to the brake pipe for effecting a further gradual reduction in brake pipe pressure.

8. In a fluid pressure brake, the combination with a brake pipe, of a quick action valve device, an emergency valve mechanism operated upon the initiation of a sudden reduction in brake pipe pressure for operating said quick action valve device to effect a local reduction in brake pipe pressure of a predetermined amount, said emergency valve mechanism being also adapted to open a restricted vent to the brake pipe for effecting a further gradual reduction in brake pipe pressure, and means operated by the initial sudden reduction in brake pipe pressure for closing off the local section of brake pipe at which the initial reduction is effected from the remainder of the brake pipe.

9. In a fluid pressure brake, the combination with a brake pipe, of an emergency valve mechanism operated upon a sudden reduction in brake pipe pressure for opening a restricted vent to the brake pipe and means operated upon a predetermined reduction in brake pipe pressure for supplying fluid from a source of fluid under pressure to the brake cylinder.

10. In a fluid pressure brake, the combination with a brake pipe, of a quick action valve device, an emergency valve mechanism operated upon a sudden reduction in brake pipe pressure for operating said quick action valve device to effect a local reduction in brake pipe pressure and the propagation of quick action through the brake pipe, said emergency valve mechanism being also adapted to open a restricted vent to the brake pipe for further reducing the brake pipe pressure, and means operated upon a predetermined reduction in brake pipe pressure through the restricted vent for supplying fluid from a source of fluid under pressure to the brake cylinder.

11. In a fluid pressure brake, the combination with a brake pipe, of a quick action valve device operating upon a sudden reduction in brake pipe pressure for effecting a predetermined local reduction in brake pipe pressure, an emergency valve mechanism operating upon the sudden reduction in brake pipe pressure for opening a restricted vent to the brake pipe for further reducing the brake pipe pressure, means operated at a predetermined reduction in brake pipe pressure through action of the restricted vent for supplying fluid from a source of fluid under pressure to the brake cylinder, and means operated upon the sudden reduction in brake pipe pressure for closing off the section of brake pipe at which the sudden reduction is initiated from the remainder of the brake pipe.

12. In a fluid pressure brake, the combination with a brake pipe, of a quick action valve device and an emergency valve mechanism having one position in which the operation of the quick action valve device is effected to produce a local reduction in brake pipe pressure and another position in which a restricted vent is opened for gradually reducing the brake pipe pressure.

13. In a fluid pressure brake, the combination with a brake pipe, of a quick action valve device and an emergency valve mechanism operated upon a sudden reduction in brake pipe pressure for first operating said quick action valve device to effect a rapid local reduction in brake pipe pressure and then adapted to move to a position in which a restricted vent is opened to the brake pipe for gradually reducing the brake pipe pressure.

14. In a fluid pressure brake, the combination with a brake pipe, of a quick action valve device and an emergency valve mechanism operated upon a sudden reduction in brake pipe pressure for first operating said quick action valve device to effect a rapid local reduction in brake pipe pressure and then adapted to move to a position in which the closing of the quick action valve device is effected and a restricted vent is opened to the brake pipe.

15. In a fluid pressure brake, the combination with a brake pipe, of a quick action valve device and an emergency valve mechanism subject to the opposing pressure of the brake pipe and a chamber and operated upon a sudden reduction in brake pipe pressure for first supplying fluid from said chamber to the quick action valve device and for then opening a restricted vent to the brake pipe and said chamber.

16. In a fluid pressure brake, the combination with a brake pipe, of a quick action valve device and an emergency valve mechanism subject to the opposing pressures of the brake pipe and a chamber and operated upon a gradual reduction in brake pipe pressure for venting fluid from said chamber and then upon a sudden reduction in brake pipe pressure for first supplying fluid from said chamber to the quick action valve device to open same and for then opening a restricted vent to the brake pipe and said chamber and for venting fluid from the quick action valve device to close same.

17. In a fluid pressure brake, the combination with a brake pipe, of a quick action valve device provided with two brake pipe check valves, one for preventing back flow to the section of brake pipe extending in one direction and the other for preventing back flow to the section of brake pipe extending in the opposite direction.

18. In a fluid pressure brake, the combination with a brake pipe, of an emergency valve mechanism having a service position, an initial emergency position and a final emergency position, a stop for defining the service position and adapted to yieldingly resist movement of the emergency valve mechanism to the initial emergency position, and an emergency stop for defining the initial emergency position and adapted to yieldingly resist movement of the emergency valve mechanism to the final emergency position.

19. In a fluid pressure brake, the combination with a brake pipe, of an emergency valve mechanism having an initial emergency position and a final emergency position, an emergency stop normally subject to opposing fluid pressures for defining the initial emergency position and adapted to yieldingly resist movement to the final emergency position, the movement of the emergency valve mechanism beyond the initial emergency position being adapted to relieve the fluid pressure on one side of the stop to thereby facilitate the movement of the emergency valve mechanism to the final emergency position.

20. The method of effecting an emergency application of the brakes upon a sudden reduction in brake pipe pressure which consists in transmitting quick serial action throughout the train to effect the opening of a restricted brake pipe vent port at each car, in closing off the local section of brake pipe where the sudden reduction in brake pipe pressure originates, from the remainder of the brake pipe, and in supplying fluid to the brake cylinder upon a predetermined reduction in brake pipe pressure by the operation of the restricted brake pipe vent ports.

In testimony whereof I have hereunto set my hand.

WALTER V. TURNER.

Witnesses:
  A. M. CLEMENTS,
  S. W. KEEFER.